2,971,977
PREPARATION OF ETHYLIDENE MALONODINITRILE

Günter Kolb, Koln-Stammheim, Germany, assignor to Agfa Aktiengesellschaft für Photofabrikation, Leverkusen, Germany, a corporation of Germany
No Drawing. Filed May 20, 1957, Ser. No. 660,076
Claims priority, application Germany June 12, 1956
3 Claims. (Cl. 260—465.8)

The present invention relates to a process of producing monomeric ethylidene malonodinitrile and to copolymers produced from said compound. It has been found that monomeric ethylidene malonodintrile is obtained by reacting about 1.5–10 mols of acetaldehyde with 1 mol of malonodinitrile at a pH of 1–7 and at temperatures of 50 to 150° C. in a medium which is substantially free from water and organic compounds with alcoholic hydroxy groups. The reaction is preferably carried out in the presence of a small proportion—preferably 0.01–1 percent as calculated on the weight of the reactants—of a basic catalyst as it is commonly used for carrying out the Knoevenagel reaction. The following catalysts are for instance suitable: inorganic or organic alkali metal salts such as potassium carbonate, sodium phosphate or sodium acetate or organic bases such as triethylamine, piperidine or salts thereof such as piperidine acetate. A feature of decisive importance for the required progress of the reaction is the maintenance of a pH value of no more than 7, preferably 3–5, and care must also be taken that the heat of reaction is dissipated. It has proved particularly desirable to work at temperatures of less than 0° C. The reaction can be carried out in the presence of a solvent such as lower aliphatic carboxylic acids such as acetic acid, propionic acid, butyric acid. It is possible to add solvents in most varied quantities, such as 0.5 to 10 times the amount of malonodinitrile applied. Water or alcohols, if at all, should only be used in quantities not surpassing 10 percent as calculated on the weight of the reaction mixture. The monomeric ethylidene malonodinitrile is a colorless liquid with a boiling point of 65–68° C./1 mm. Hg.

Reactions between malonodinitrile and acetaldehyde have already been disclosed in Ber. 55 (1922), page 3440. In this case, however, saturated compounds were obtained, one of which can be represented as ethylidenebis-malonodinitrile $CH_3.CH(CH(CN)_2)_2$, and the other as

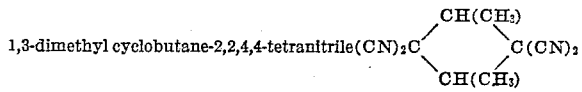
1,3-dimethyl cyclobutane-2,2,4,4-tetranitrile$(CN)_2C\underset{CH(CH_3)}{\overset{CH(CH_3)}{\diagup\!\!\!\!\diagdown}}C(CN)_2$ Moreover, Chemisches Zentralblatt, vol. 1,613 (1921) refers to a method of preparing ethylidene malonodinitrile in accordance with a Finnish literature reference by G. J. Oestling. The reaction product obtained in accordance with this article melts at 77–78° C. When this process was carried out, it was found that, depending on the reaction conditions, one of the two aforementioned saturated reaction products was obtained, or a mixture thereof.

Polymerisable organic compounds, such as for example mono-olefines and polyolefines, are in general suitable as copolymerisation components for the production of copolymers from the monomeric ethylidene malonodinitrile. Examples of such olefines are: vinyl aromatic hydrocarbons such as styrene, divinyl benzene, o-methylstyrene, p-chlorostyrene, olefinic compounds having one CN group, such as acrylonitrile, α-methyl-acrylonitrile, crotonic acid nitrile, conjugated dienes, such as butadiene, and also the homologues and derivatives of butadiene such as isoprene, dimethylbutadiene, 2-cyanobutadiene, preferably 2-chlorobutadiene-1,3. The polymerisation of these unsaturated compounds with the monomeric ethylidene malonodinitrile can be carried out in bulk, solution, emulsion or suspension. The known free radical-forming compounds can be used as activators, especially potassium persulphate, benzoyl peroxide and tetraphenyl succinic dinitrile. The known emulsifiers and also, if desired, regulating agents can be used when the polymerisation is carried out in emulsion. In this case, the pH value of the emulsion is advantageously adjusted to 7 or less than 7, preferably 2–6. The copolymerisation compounds are preferably applied in quantities varying between 0.5 and 30 percent based on the weight of the total monomers.

It has been established that the monomeric ethylidene malonodinitrile surprisingly yields copolymers of very regular structure with the said polymerisable organic compounds, that is to say, independently of the extent of the conversion and the amount of the ethylidene malonodinitrile introduced, copolymers are obtained which have a composition corresponding to the proportions of the copolymerisation components used. If conjugated diolefines are used as the second polymerisation component, it is found that the vulcanisates of the copolymers obtained show excellent technological properties, and these vulcanisates have proved to be resistant to benzines, fats and oils. The copolymers with 2-chlorobutadiene are of particular interest. Even when very small proportions of ethylidene malonodinitrile (0.5–5% by weight, based on the chlorobutadiene) are used, the copolymers do not show any tendency to crystallise or harden on storage. This is surprising, since it is a known disadvantage of most polymers of chlorobutadiene that they harden after being stored for a short time at room temperature. Furthermore, vulcanisates of the copolymers of chlorobutadiene show improved resistance to benzine and benzene when the ethylidene malonodinitrile is used in the copolymerisation in proportions of approximately 5–30% by weight, based on the chlorobutadiene.

In the following examples, the parts indicated are parts by weight:

*Example 1*

100 parts of malonodinitrile were dissolved in 150 parts of freshly distilled acetaldehyde. The solution was cooled to −15° C. and 15 parts of 5% aqueous potassium carbonate solution were added dropwise at this temperature while stirring. The reaction mixture was stirred for another hour at −10° C., and then it was mixed with 600 parts of ice-cold water; 400 parts of cooled saturated common salt solution were added and the mixture was submitted to extraction with 400 parts of benzene.

The benzene extract was washed with water and dried with fused calcium chloride, the benzene was distilled off in vacuo with a water bath temperature of 35° C. and the residue was distilled at 1 mm. Hg. There were obtained 102 parts of a crystal-clear colourless liquid with a $B.P._{1\ mm.}$ 65–68° C.; this liquid does not crystallize at room temperature and is miscible with benzene in any proportion. Yield: 73% of the theoretical.

Analysis showed the following values:

| | Found | Calculated for $CH_3-CH=C\diagup^{CN}_{\diagdown CN}$ |
|---|---|---|
| | Percent | Percent |
| C | 65.3 | 65.3 |
| H | 4.75/4.45 | 4.35 |
| N | 30.3/30.12 | 30.4 |

Example 2

1400 parts of water, 500 parts of a 10% aqueous solution of the sodium sulphonate of a paraffin with 12-18 carbon atoms, 10 parts of n-dodecyl mercaptan and 100 parts of a 5% aqueous potassium persulphate solution were placed in a 6-litre autoclave made of stainless steel, and the autoclave was evacuated, filled with pure nitrogen and the monomers set out in the following table were introduced under pressure. Polymerisation was carried out at 50° C. while stirring. The latex obtained was precipitated with saturated sodium chloride solution, and the coagulate obtained was washed with water and dried at 70° C.

The results obtained are set out in the following table:

| Amount of butadiene used in g. | 900 | 800 | 700 | | | |
|---|---|---|---|---|---|---|
| Amount of styrene used in g. | | | | 900 | 800 | 700 |
| Amount of ethylidene malodinitrile used in g. | 100 | 200 | 300 | 100 | 200 | 300 |
| Total yield in g. after 24 hours | 920 | 970 | 950 | 950 | 930 | 960 |
| Percent of ethylidene malonodinitrile incorporated by polymerisation | 9.2 | 18.4 | 25.6 | 8.7 | 17.7 | 27.4 |

Example 3

20 parts of the sodium salt of a sulphonic acid of a paraffin with 12-18 carbon atoms were dissolved in 2000 parts of water, and 900 parts of 2-chlorobutadiene and 100 parts of ethylidene malonodinitrile were added together with 15 parts of diisopropyl xanthogen disulphide and suspended with stirring. The autoclave was freed from oxygen by flushing with nitrogen. The autoclave was then cooled to 3° C. and the mixture polymerised by forcing in under pressure 5 parts of potassium persulphate, dissolved in 50 parts of water. The polymerisation was stopped after 4½ hours by introducing under pressure 20 parts of hydroquinone, dissolved in 200 parts of water. The yield obtained was 67.7% of the theoretical. Samples were taken with different degrees of polymerisation yields, these samples were precipitated with ethyl alcohol, and these precipitates were submitted to extraction with boiling methyl alcohol for 24 hours, dried in vacuo at 50° C. and analyzed. The resulting material had the following analytical data:

| Samples taken with— | percentage of ethylidene malonodinitrile incorporated by polymerisation |
|---|---|
| 25.2% conversion | 9.8 |
| 37.5% conversion | 9.6 |
| 48.6% conversion | 9.6 |
| 57.3% conversion | 9.7 |
| 65% conversion | 9.6 |

Example 4

As described in example 3, 750 parts of 2-chlorobutadiene and 250 parts of ethylidene malonodinitrile were polymerised with the addition of 25 parts of diisopropyl xanthogen disulphide. The samples taken showed the following analytical data.

| Samples taken with— | percentage of ethylidene malonodinitrile incorporated by polymerisation |
|---|---|
| 13.5% conversion | 22.8 |
| 30.0% conversion | 23.6 |
| 45.0% conversion | 23.5 |
| 58.5% conversion | 23.8 |
| 69% conversion | 23.8 |

Example 5

The latices described in Examples 3 and 4 were precipitated with saturated sodium chloride solution, washed with water and dried at 70° C. The polymers were mixed in accordance with the following specification:

100 parts of copolymer
3 parts of active zinc oxide
4 parts of magnesium oxide
30 parts of inactive carbon black
1 part of stearic acid
0.5 part of ethylene thiourea
0.6 part of paraffin
2 parts of phenyl-α-naphthylamine The following values were obtained:

| Polymer from example | 3 | 4 | comparison values of a poly-2-chlorobutadiene produced in analogous manner |
|---|---|---|---|
| Defo value of mixture 20° C.[1] | 3,320/20 | 2,750/15 | 2,900/15. |
| After storage for 3 days at 25° C. | 3,470/19 | 3,250/18 | 17,000/53. |
| After storage for 7 days at 25° C. | 3,650/21 | 2,650/17 | no longer measurable; higher than 20,000. |

[1] Plasticity determined according to Bader, Kautschuk 14 (1933) page 223.

The mixtures were heated for 45 minutes at 130° C.
The vulcanisates thus obtained had the following properties:

| | | | |
|---|---|---|---|
| Increase in volume in percent after storing for 24 hours at 50° C. in benzine | 12 | 0.9 | 50 |
| Increase in volume in percent after storing for 24 hours at 50° C. in benzene | 220 | 180 | 275 |
| Increase in volume in percent after storing for 7 days at 125° C. in mineral oil | 5 | 0.7 | 100 |

I claim:

1. A process of producing monomeric ethylidene malonodinitrile which comprises reacting 1.0-10 mols of acetaldehyde with 1 mol of malonodinitrile in an inert medium wherein the content of water and compounds with alcoholic hydroxy groups is restricted to not more than 10% by weight of the reaction mixture, at a pH of about 1-7 in the presence of a basic catalyst at a temperature of about −50° to 50° C. and recovering the reaction product in the form of a colorless liquid having a boiling point of about 65-68° C. at 1 mm./Hg.

2. A process of claim 1 wherein the reaction temperature is less than 0° C.

3. A process of claim 1 wherein the reaction medium contains a lower aliphatic carboxylic acid in an amount of 0.5-10 times the amount of malonodinitrile.

References Cited in the file of this patent

UNITED STATES PATENTS

| 2,239,441 | D'Alelio | Apr. 22, 1941 |
| 2,398,321 | Mowry | Apr. 9, 1946 |
| 2,465,318 | Seymour | Mar. 22, 1949 |
| 2,466,395 | Dickey | Apr. 5, 1949 |
| 2,600,679 | Park | June 17, 1952 |
| 2,615,872 | Averill | Oct. 28, 1952 |
| 2,692,883 | Patrick et al. | Oct. 26, 1954 |
| 2,740,769 | Gilbert et al. | Apr. 3, 1956 |

OTHER REFERENCES

Osterling: Chem. Abstracts, vol. 15, page 2829 (1921).
Gilbert et al.: Journ. Amer. Chem Soc., vol. 78, pages 1669-1675 (1956).
Starkweather et al.: Ind. & Eng. Chem., vol. 39, pages 210-222 (1947).